United States Patent
Kang (10) Patent No.: US 8,411,128 B2
(45) Date of Patent: Apr. 2, 2013

(54) APPARATUS AND METHOD FOR CONTROLLING CAMERA OF PORTABLE TERMINAL

(75) Inventor: Kyung Won Kang, Busan Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 12/483,844

(22) Filed: Jun. 12, 2009

(65) Prior Publication Data
US 2010/0022271 A1 Jan. 28, 2010

(30) Foreign Application Priority Data
Jul. 22, 2008 (KR) .................. 10-2008-0071336

(51) Int. Cl.
H04N 7/14 (2006.01)
(52) U.S. Cl. ................ 348/14.04; 348/14.01; 348/14.02; 348/14.03; 370/259; 379/419; 715/716
(58) Field of Classification Search .... 348/14.01–14.16; 370/259–271, 351–356; 709/201–207, 217–248; 455/412.1–420, 426.1, 426.2, 550.1–560, 455/575.1–575.9, 90.1–90.3
See application file for complete search history.

(56) References Cited

U.S. PATENT DOCUMENTS

| | | | |
|---|---|---|---|
| 7,330,607 B2 | 2/2008 | Jung et al. | |
| 7,742,068 B2 * | 6/2010 | Cupal et al. | 348/14.01 |
| 7,831,141 B2 * | 11/2010 | Wassingbo et al. | 396/429 |
| 2005/0073574 A1 * | 4/2005 | Krisbergh et al. | 348/14.01 |
| 2005/0074185 A1 * | 4/2005 | Jung et al. | 382/298 |
| 2006/0077258 A1 * | 4/2006 | Allen et al. | 348/169 |
| 2006/0126894 A1 * | 6/2006 | Mori | 382/103 |
| 2006/0152578 A1 * | 7/2006 | Kim | 348/14.01 |
| 2007/0247515 A1 * | 10/2007 | Roman | 348/14.02 |
| 2007/0291104 A1 * | 12/2007 | Petersen et al. | 348/14.01 |
| 2008/0018729 A1 * | 1/2008 | Hamada | 348/14.01 |
| 2009/0015681 A1 * | 1/2009 | Pipkorn | 348/208.12 |

FOREIGN PATENT DOCUMENTS

| | | | |
|---|---|---|---|
| KR | 10-2005-0033949 A | 4/2005 | |
| KR | 10-2007-0075581 A | 7/2007 | |

\* cited by examiner

Primary Examiner — Hemant Patel
(74) Attorney, Agent, or Firm — Jefferson IP Law, LLP (57) ABSTRACT

An apparatus and method for controlling a camera of a portable terminal are provided. The method includes determining a rate at which at least a portion of a subject occupies an input image obtained in a video phone call from camera, comparing the determined rate with a preset reference level, automatically controlling a zoom function of the camera according to the comparison result, and transmitting the input image obtained from the camera in which the zoom function is automatically controlled.

18 Claims, 5 Drawing Sheets

APPARATUS AND METHOD FOR CONTROLLING CAMERA OF PORTABLE TERMINAL

PRIORITY

This application claims the benefit under 35 U.S.C. §119(a) of a Korean patent application filed in the Korean Intellectual Property Office on Jul. 22, 2008 and assigned Serial No. 10-2008-0071336, and the entire disclosure of which is hereby incorporated by reference.

BACKGROUND OF THE INVENTION

1. Field of the Invention

The present invention relates to an apparatus and method for controlling a camera of a portable terminal. More particularly, the present invention relates to an apparatus and method for controlling a camera of a portable terminal that automatically controls a zoom function of the camera in a video phone call.

2. Description of the Related Art

As mobile communications technology develops and portable terminals are widely used, the portable terminal provides various useful functions. For example, a user can take advantage of services including text transfer, photography and listening to music, by using the portable terminal. More particularly, the portable terminal provides a video phone call service which a user can communicate over the portable terminal while viewing the face of a user in another portable terminal which provides a third generation mobile communications service.

The video phone call service is a service that can transmit an image obtained by taking a picture of one's own figure through a camera in the portable terminal, while receiving an image which the user of the another portable terminal transmitted, thereby enabling communication over the portable terminals, while mutually looking at the figure of each user of the portable terminals.

In such a conventional video phone call, a rate at which a subject occupies an input image is changed depending on the distance of the portable terminal and the subject (e.g., user). That is, if a distance between the portable terminal and the subject is short, the rate which a subject occupies an input image is increased. Whereas, if the distance between the portable terminal and the subject is long, the rate that a subject occupies an input image becomes smaller. Therefore, in the conventional method for the video phone call, in order to provide a fixed image (i.e., a fixed image that has a fixed rate which a subject occupies an input image) to the user of the another portable terminal, the distance between the portable terminal and the subject should be uniformly maintained. However, in the conventional video phone call the user has to continuously verify the input image photographed by the camera through a display of terminal. Accordingly, the user is not able to concentrate on the video phone call.

Therefore, a need exists for an apparatus and method for controlling a zooming function of a camera of a portable terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for controlling a camera of a portable terminal that automatically controls a zoom function of the camera such that a rate which at least a portion of a subject occupies an input image corresponds to a preset reference level.

In accordance with an aspect of the present invention, a method for controlling a camera of a portable terminal is provided. The method includes determining a rate at which at least a portion of a subject occupies an input image obtained in a video phone call from the camera, comparing the determined rate with a preset reference level, automatically controlling a zoom function of the camera according to the comparison result, and transmitting the input image obtained from the camera in which the zoom function is automatically controlled.

In accordance with another aspect of the present invention, an apparatus for controlling a camera of a portable terminal is provided. The terminal includes a camera for taking a picture of an input image including a subject in a video phone call, a storage unit for storing a reference level, and a controller for determining a rate at which at least a portion of the subject occupies the input image, for comparing the determined rate with the reference level, and for automatically controlling a zoom function of the camera according to the comparison result.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like references numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention illustrate a portable terminal as a mobile communications terminal, for convenience. However, the exemplary embodiments of the present invention are not limited thereto. For example, the portable terminal may be a terminal which is available for a video phone call. The portable terminal may be applied to information telecommunications devices such as, a Personal Digital Assistant (PDA), a Smart phone, an International Mobile Telecommunication 2000 (IMT-2000) terminal, a Universal Mobile Telecommunication Service (UMTS) terminal, a digital broadcasting terminal and the like, and a multimedia device and application.

Hereinafter, "input image" denotes an image photographed through a camera of the portable terminal. The input image may be transmitted to another portable terminal in the video phone call.

Hereinafter, "reference level" denotes a rate which at least a portion (e.g., the face of a user) of a subject (e.g., the user) occupies the input image. The reference level may be set up in a category, such as person or group stored in a phone book of the portable terminal. The reference level may be set up to have a certain range value. For example, if a rate which at least a portion of the subject occupies the input image is about 80% or more and lower than about 95%, the reference level is set as a first level. If the rate is about 60% or more and lower than about 80%, the reference level is set as a second level. If the rate is about 40% or more and lower than about 60%, the reference level is set as a third level. The reference level may be differently set in the person or group category stored in the phone book. However, an exemplary embodiment of the present invention is not limited to a ratio range and a level step as described above. That is, the ratio range and the level step according to the level may be variously set up according to a designer or user intentions.

Figure 1:
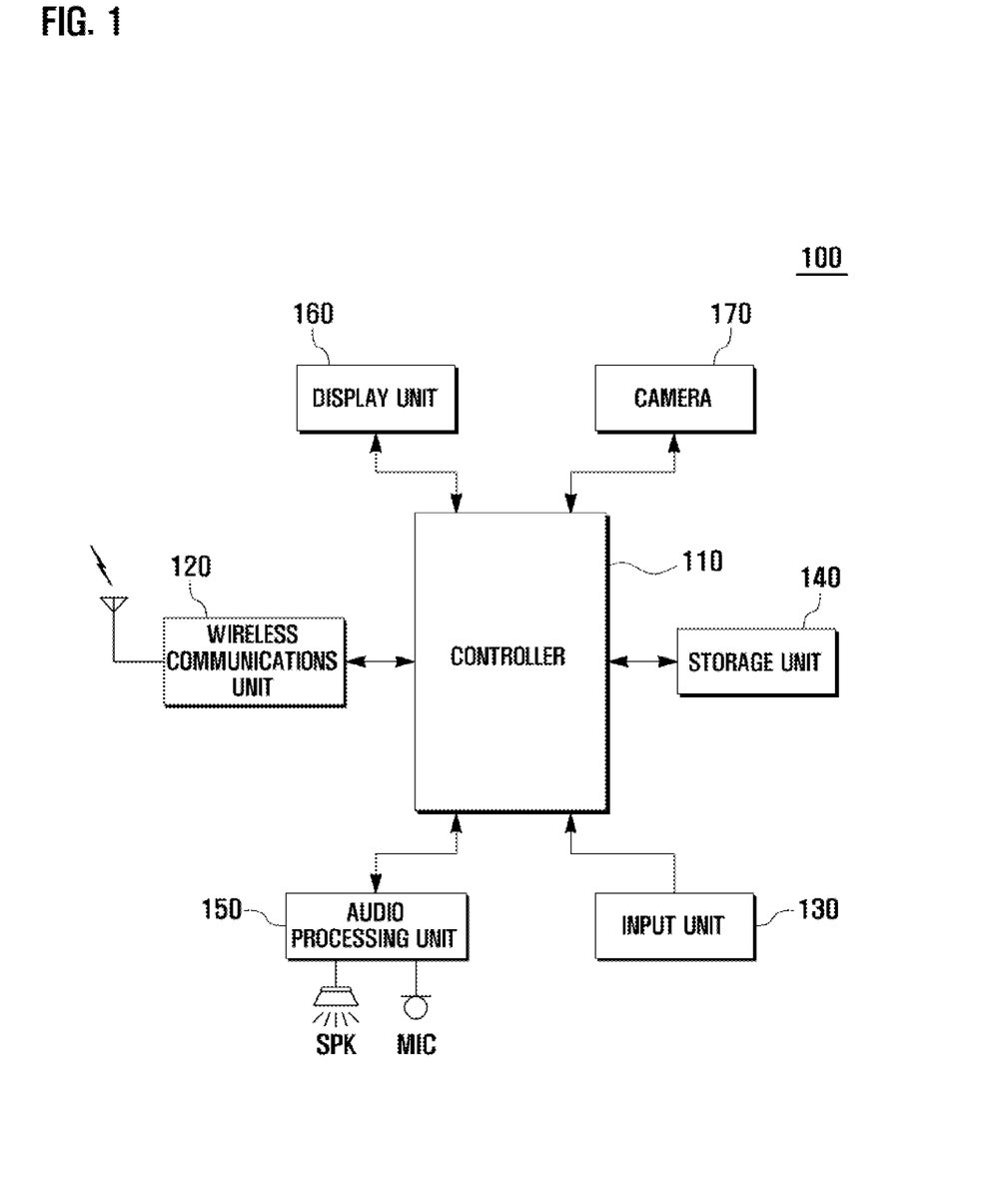
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

Referring to FIG. 1, the portable terminal 100 includes a controller 110, a wireless communications unit 120, an input unit 130, a storage unit 140, an audio processing unit 150, a display unit 160 and a camera 170.

The wireless communications unit 120 may form a communications channel with a base station for data communication and voice communication with another portable terminal. The wireless communications unit 120 includes a wireless frequency transmitter (not illustrated) which up-converts and amplifies a frequency of a transmitted signal, and a wireless frequency receiver (not illustrated) which low-noise amplifies the received signal and down-converts the frequency. More particularly, the wireless communications unit 120 may transceive image data for a video phone call under the control of the controller 110.

The input unit 130 may include a plurality of input keys and function keys for receiving number or character information and setting up various functions. The function keys may include a direction key, a side key and a shortcut key which are set up to perform a specific application. Moreover, the input unit 130 may determine a key input signal input in connection with the function control of the portable terminal 100 and transmit to the controller 110. More particularly, the input unit 130 may include the function key which activates or inactivates a zoom control function of the camera 170 in the video phone call.

The storage unit 140 may store user data as well as a necessary program in a function operation of the portable terminal 100. The storage unit 140 may include a program area and a data area.

The program area may store an Operating System (OS) which controls the overall operation of the portable terminal 100 and an application program which is necessary for remaking multimedia contents. More particularly, the program area may store the application program for controlling the zoom function of the camera 170. Moreover, the program area may store an application program for face recognition. The face recognition program may detect the contour of a subject. The face recognition program may also recognize the subject's eyes, nose, mouth and the like if the subject is a person. Face recognition technology is well known in the art. Therefore, a detailed description thereof will be omitted.

The data area may be an area in which data generated according to use of the portable terminal 100 are stored. Also, a phone book, audio data and corresponding contents or information corresponding to user data may be stored in the data area. More particularly, the data area may store the reference level according to the person or group category stored in the phone book.

The audio processing unit 150 may determine an audio signal received through the wireless communications unit 120 under the control of the controller 110 and transmit the audio signal to a Speaker (SPK) or transmit the audio signal including the user's voice input from a Microphone (MIC) through the wireless communications unit 120. More particularly, if the rate at which the subject occupies the input image, which is controlled by the zoom function of the camera 170, does not correspond to a preset reference level in the video phone call, the audio processing unit 150 may output an alarm which informs the user. For example, if the rate at which the subject occupies the input image does not correspond to the reference level, even if the zoom-out function of camera is at maximum, as the face of user is close to the portable terminal 100, the audio processing unit 150, under the control of the controller 110, may output an alarm which informs the user. Moreover, if the contour of the user is not detected from the input image as the camera 170 adheres close to the user, the audio processing unit 150, under the control of the controller 110, may output an alarm which informs the user.

The display unit 160 may display various information which provides user data, function setting information that the user input, or various information which is provided to the user, as well as various menu screens of the portable terminal 100. The display unit 160 may be formed with a Liquid Crystal Display (LCD). The display unit 160 may also include an input means in the form of a touch screen. The display unit 160 may display an image that was transmitted from the another portable terminal and an image that was photographed through the camera 170 during the video phone call. Otherwise, the display unit 160 may display one image among the images that transmitted from the another portable terminal or the image photographed through the camera 170 according to a selection from the user. More particularly, if the rate which the subject occupies the input image which is controlled by the zoom function of the camera 170 does not correspond to a preset reference level in the video phone call, an alarm message which informs the user may appear on the display unit 160. For example, if the rate at which the subject occupies the input image does not correspond to the reference level, even if the zoom-out function of the camera is at maximum, as the face of the user is close to the portable terminal 100, the display unit 160, under the control of the controller 110, may display an alarm message which informs the user. Moreover, if the contour of the user is not detected from the input image as the camera 170 adheres closely to the user, the display unit 160, under the control of the controller 110, may output an alarm message which informs the user.

The camera 170 may take a picture of a subject for transmitting to the another portable terminal in the video phone call. For example, the camera 170, under the control of the controller 110, may take a picture of a figure of the user. More particularly, the camera may take a picture of the figure of the user including the face of the user. The camera 170 may include a camera sensor which converts an input optical signal into an electric signal, a signal processing unit which converts an analog video signal into a digital video signal and an image processor which image-processes (e.g., scaling, noise elimination, RGB signal conversion and the like) the video signal in order to display the video signal output from the signal processing unit to the display unit 160. Here, the camera sensor may be a Charge Coupled Device (CCD) sensor or a Complementary Metal Oxide Semiconductor (CMOS) sensor. The signal processing unit may be implemented with a Digital Signal Processor (DSP). More particularly, the camera 170 may include the zoom function. The camera 170 may control the zoom function under the control of the controller 110 such that the rate at which the subject occupies the input image, which is photographed in the video phone call, corresponds to the reference level. For example, if the rate at which the subject occupies the input image is larger than a preset reference level, the camera 170 may perform a zoom-out operation. Whereas, the camera 170 may perform a zoom-in operation if the rate at which the subject occupies the input image is smaller than the preset reference level. A more detailed description of the zoom-out and zoom-in operations will be described below.

The controller 110 controls overall operations of the portable terminal 100, a signal flow between inner blocks and a data handling function. More particularly, the controller 110 controls the zoom function of the camera 170 in the video phone call so that the rate at which the subject occupies the input image corresponds to the reference level. When the subject is the user, the controller 110 may control the face recognition program included in the storage 140. In more detail, the controller 110 detects the contour of the user in the input image by controlling the face recognition program, and confirms the size of the inside contour of the detected user. Thereafter, the controller 110 confirms whether the rate at which the user occupies the input image corresponds to a preset reference level, and may control the zoom function of the camera 170 according to the confirmation.

As described above, an exemplary embodiment of the present invention detects the contour of the user and controls the zoom function of the camera 170. For example, the zoom function of the camera 170 may be controlled according to a distance between the user's eyes, the user's face size and a rate the eyes and mouth of the user are mapped as vertices of a triangle that occupies the input image.

The controller 110 may confirm the another portable terminal information in the video phone call connection if the reference level is set up in the person or group category. The another portable terminal information may be a telephone number or a name. The controller 110 which confirmed the another portable terminal information may search whether the another portable terminal information is stored in the phone book. If the another portable terminal information exists in the phone book, the controller 110 may confirm whether a preset reference level exists in an individual or a group in which the individual belongs. At this time, if the reference level does not exist or the another portable terminal information does not exist in the phone book, the controller 110 may set up the reference level as a default value.

The controller 110 pauses the zoom control function of the camera 170 when a preset function key is input so that the camera 170 may transmit an existing image which is input to the another portable terminal. Moreover, the controller 110 may activate or inactivate the zoom control function of the camera 170 through the menu of the portable terminal 100.

Although not illustrated, the portable terminal 100 may further include elements having an additional function, such as a broadcasting reception module, a connection terminal for data interchanging with an external digital device, a charging terminal, a digital sound reproducing module, such as a Moving Picture Experts Group Phase 1 Audio Layer 3 (MP3) module and the like. That is, elements equivalent to the above described elements may be further included in the portable terminal 100 according to a convergence trend of a digital device.

Hereinafter, an exemplary video phone call process of the portable terminal 100 will be illustrated with reference to FIG. 2.

Figure 2:
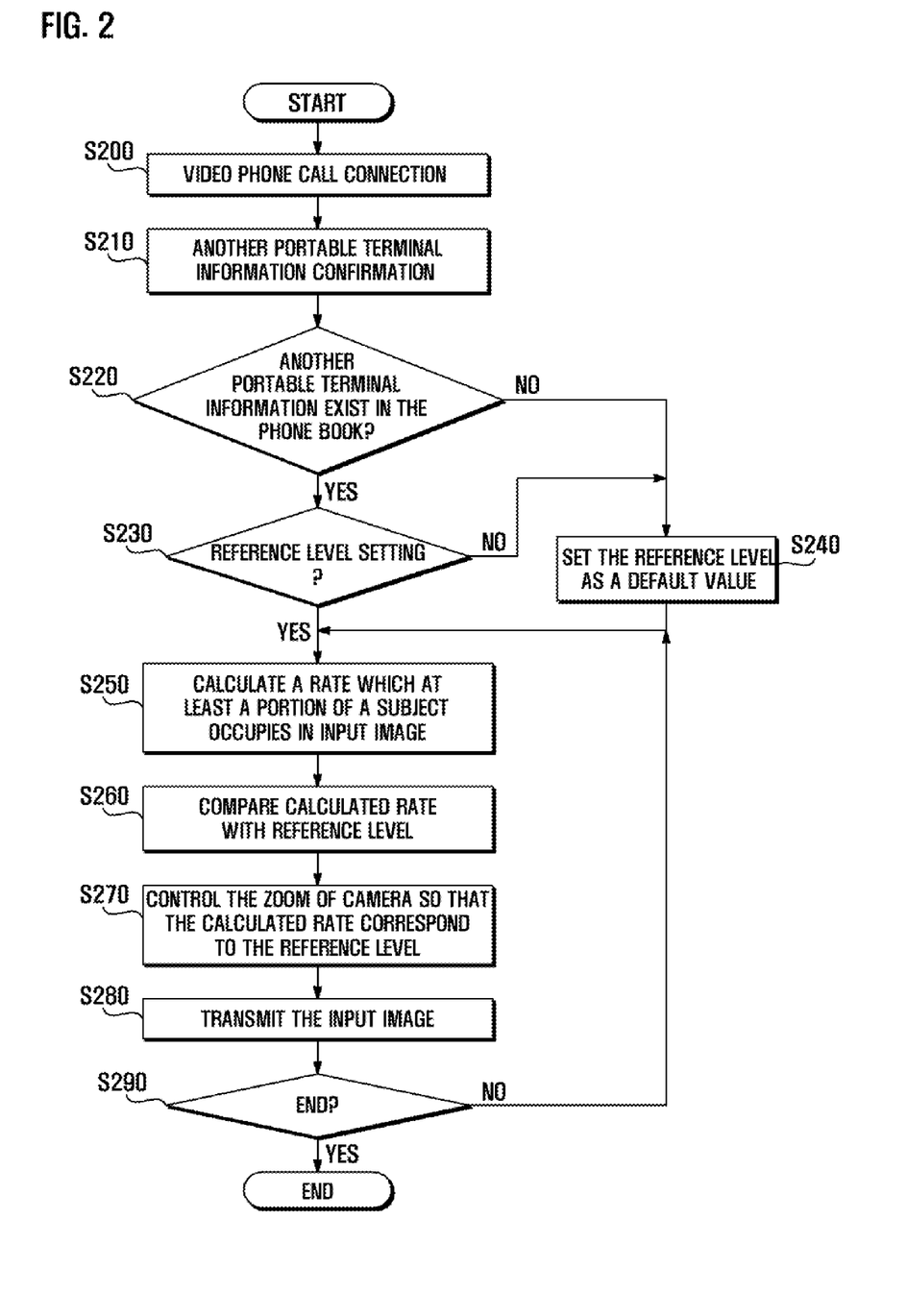
FIG. 2 is a flowchart illustrating a video phone call process of a portable terminal according to an exemplary embodiment of the present invention.

FIG. 2 is flowchart illustrating the video phone call process of a portable terminal according to an exemplary embodiment of the present invention.

Referring to FIG. 1 and FIG. 2, the controller 110 may connect the video phone call in step S200. Here, the video phone call connection may include a video phone call request transmission and a video phone call request reception. In the video phone call connection, the controller 110 may confirm the another portable terminal information in step S210. The another portable terminal information may be a telephone number and a name. Thereafter, the controller 110 may search whether the another portable terminal information is registered in the phone book in step S220. If the another portable terminal information is not registered in the phone book in step S220, the controller 110 may set up the reference level as a default value in step S240. On the other hand, if the another portable terminal information is registered in the phone book, the controller 110 may confirm whether the reference level is set up for the another portable terminal information in step S230. A reference level set confirmation process may be performed for the person category and the group category stored in the phone book. Here, a personal setting may take precedence by the controller 110 if the setting of the reference level is overlapped in the person and group categories.

When the reference level is not set up in step S230, the controller 110 proceeds to step S240 and may set up the reference level as a default value. On the other hand, if the reference level is set up for the another portable terminal information in step S230, the controller 110 may determine the rate which at least a portion of the subject occupies the input image in step S250. The at least a portion of the subject may be the user's face, contour of the user, the eyes and lips of the user which are mapped as vertices of a triangle and a distance between the user's eyes. Accordingly, the controller 110 may control the face recognition program included in the storage 140. If the subject is a person, the face recognition program may detect the subject's contour, eyes, nose, mouth and the like. A face recognizing method is a well known technology. Therefore, a detailed description thereof will be omitted.

The controller 110 compares the determined rate with the reference level in step S260, and may automatically control the zoom function of the camera 170 according to the comparison result in step S270. A more detailed description of the zoom function control of the camera 170 will be described below.

The controller 110 may transmit the input image in which the rate that the subject occupies is controlled to correspond to the reference level of the another portable terminal in step S280. The controller 110 may detect an end signal input after transmitting the input image to the another portable terminal in step S290. If the end signal is not detected in step S290, the controller 110 returns to step S250. However, if the end signal is detected in step S290, the controller 110 may end the video phone call. The termination signal may be an end key signal or a signal which is generated when closing a folder type terminal case, and a signal which is generated when sliding a slide-type terminal case. The video phone call may not end through a preset function key input or an option menu of the portable terminal, but may end through the zoom control function of the camera 170.

Figure 3:
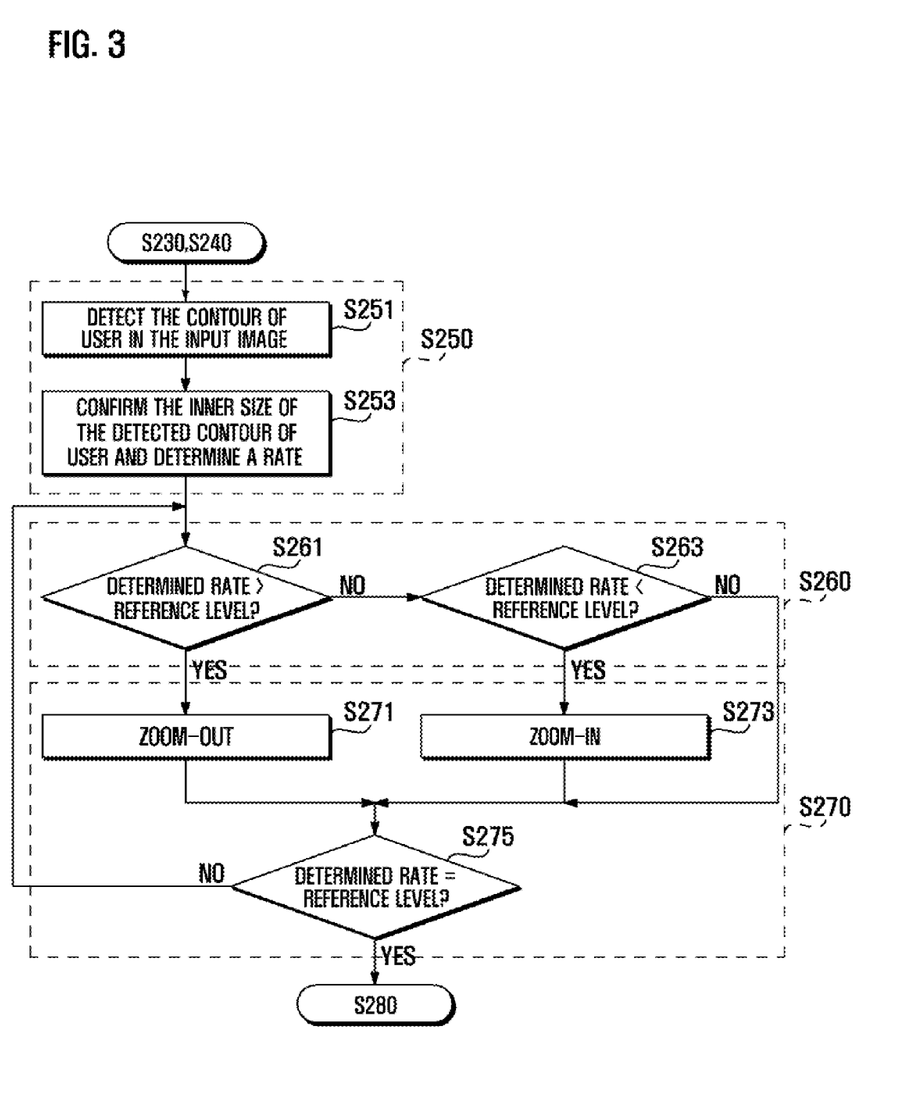
FIG. 3 is a flowchart illustrating a zoom control process of a camera according to an exemplary embodiment of the present invention.
Figure 4A:
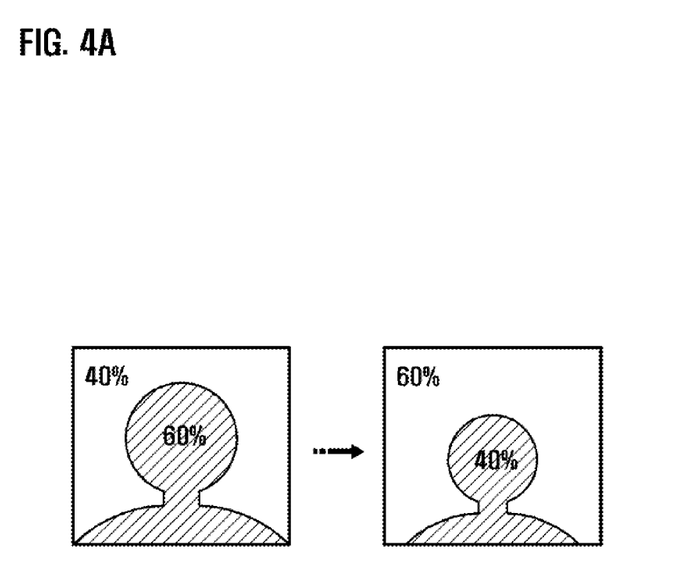
FIG. 4A and FIG. 4B illustrate an exemplary screen of a zoom control process of a camera according to an exemplary embodiment of the present invention.
Figure 4B:
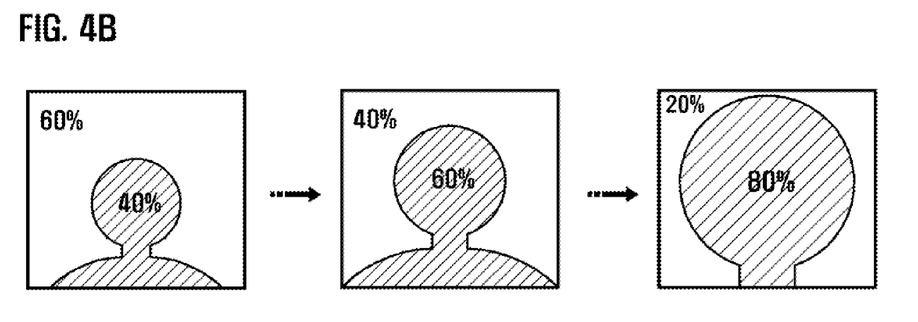

FIG. 3 is a flowchart for illustrating a zoom control process of a camera according to an exemplary embodiment of the present invention. FIG. 4A and FIG. 4B illustrate an exemplary screen of a zoom control process of a camera according to an exemplary embodiment of the present invention.

Hereinafter, descriptions will be made with reference to the subject being a person in FIG. 4A and FIG. 4B.

Referring to FIG. 3, FIG. 4A and FIG. 4B, the controller 110 proceeds to step S251 after step S230 or step S240 in FIG. 2, and may detect the contour of the user in the input image obtained from the camera 170. Accordingly, the controller 110 may run a face recognition program stored in the storage 140. After the controller 110 detects the contour of the user in the input image by using the face recognition program, the controller 110 proceeds to step S253 to confirm an inner size of the detected contour of the person and may determine a rate which the user occupies the input image.

The controller 110 proceeds to step S261 and may confirm whether the determined rate is greater than a preset reference level. In step S261, if the determined rate is greater than the preset reference level, the controller 110 proceeds to step S271 and may zoom-out of the image of the camera 170. In more detail, if the determined rate is about 60%, and the preset reference level is about 40% in the input image, the controller 110 may zoom-out of the image of the camera 170, as illustrated in FIG. 4A. The controller 110 proceeds to step S275 to determine the rate again which the user occupies the zoom-out input image and confirms whether the rate corresponds to the reference level. After the confirmation, if the determined rate does not correspond to the reference level, the controller 110 may return to step S261. On the other hand, after the confirmation, if the determined rate corresponds to the reference level, the controller 110 proceeds to step S280 and may transmit the input image to the another portable terminal.

If the rate determined in step S261 is not larger than the reference level, the controller 110 proceeds to step S263 and may confirm whether the determined rate is smaller than the reference level. If the determined rate is smaller than the reference level at step S263, the controller 110 proceeds to step S273 and may zoom-in the image of camera 170, as shown in FIG. 4B. When the camera 170 zooms-in with a constant rate, the controller 110 confirms the rate of the subject which occupies the input image after the zoom-in operation. The controller 110 also confirms whether the rate corresponds to the reference level. For example, as illustrated in FIG. 4B, if the determined rate is about 40% and the reference level is about 80%, the rate which the user occupies may be about 80% after performing two zoom-in operations. Otherwise, the controller 110 may control the zoom ratio of the camera 170 according to the difference of the determined rate and the reference level. For example, if the difference of the determined rate and the reference level may be about −40%, the controller 110 may activate the zoom-in operation of the camera 170 as much as the rate of 40%. On the contrary, if the reference level has the value of about +40%, the controller 110 may activate the zoom-out operation of the camera 170 as much as the rate of about 40%.

However, if the rate determined in step S263 is not smaller than the reference level, the controller 110 proceeds to step S275 and confirms whether the determined rate corresponds to the reference level. After the confirmation, if the determined rate does not correspond to the reference level, the controller 110 may return to step S261. However, after the confirmation, if the determined rate corresponds to the reference level, the controller 110 may proceed to step S280.

As described above, the reference level illustrates a specific value. However, the specific value is not limited thereto. For example, as described above, the reference level may be set up to have a certain range value.

As described above, the zoom-in or the zoom-out operation of the camera 170 is performed by confirming the rate which the subject occupies the input image. However, an exemplary embodiment of the present invention is not limited thereto. For example, the controller 110 may control the zoom function of the camera 170 according to a distance between the user's eyes, the user's face size, and a rate that the user's eyes and mouth which are mapped as vertices of a triangle occupies the input image. Moreover, when the portable terminal 100 includes a distance sensor, the distance sensor measures the distance between the subject and the portable terminal 100. The camera may be activated to zoom-out, if the distance becomes short. However, the camera may be activated to zoom-in, if the distance becomes long such that the rate which the subject occupies the input image corresponds to the preset reference level.

Figure 5:
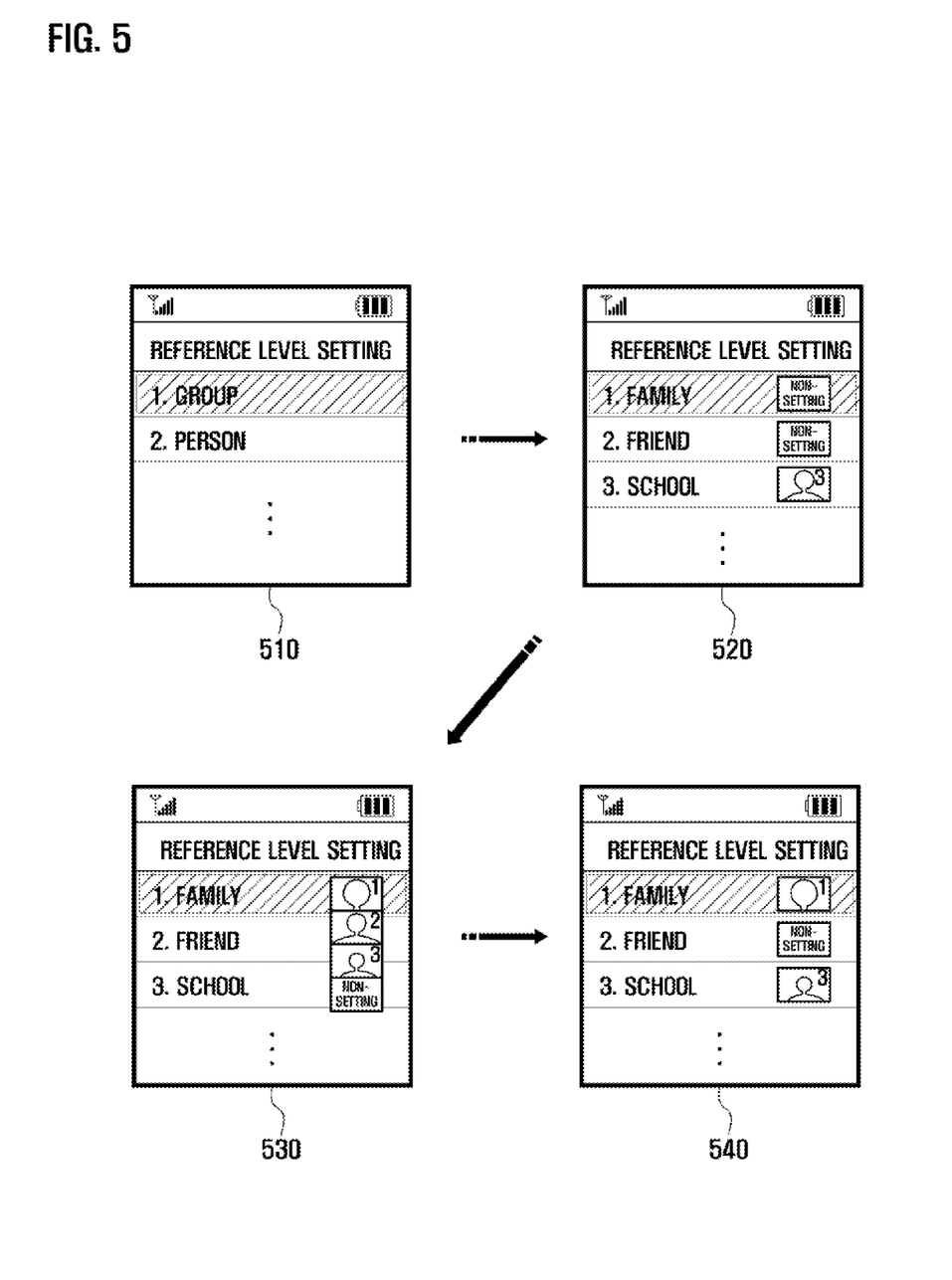
FIG. 5 is an exemplary screen illustrating a reference level setup procedure according to an exemplary embodiment of the present invention.

FIG. 5 is an exemplary screen illustrating a reference level setup procedure according to an exemplary embodiment of the present invention.

Hereinafter, FIG. 5 illustrates that the reference level may be setup in steps. However, the setup of the reference level is not limited thereto. That is, the reference level may also be set as a certain range value.

Referring to FIG. 1 to FIG. 5, the user may activate a reference level setting menu among the menu of the portable terminal 100 to set up the reference level. The display unit 160 may display a first screen 510 when the user activates the reference level setting menu. The user may select in the first screen 510 whether the reference level is set to the person or group category. Hereinafter, descriptions will be made with the reference level being set in the group category. If the setting is selected in the group category in the first screen 510, the display unit 160 may display in a second screen 520 a group list stored in the storage unit 140. Referring to the second screen 520, the set reference level may be displayed on the side of a group name. The second screen 520 displays a first reference level including a family group, a second reference level including a friend group and a third reference level including a school group. In the second screen 520, when the family group is selected to set the reference level, the display unit 160 may display in a third screen 530 a plurality of reference levels with a slide menu. If level 1 of the plurality of reference levels is selected by the user in the slide menu, the display unit 160 may display a fourth screen 540 illustrating that the reference level of the family group is set as level.

Each reference level as described above is displayed by a picture. However, an exemplary embodiment of the present invention is not limited thereto. For example, the reference level may be displayed with a number (e.g., step 1, step 2 and the like) or a rate (e.g., 80%, 70% and the like). The portable terminal as described above includes a menu for setting the reference level. However, the present invention is not limited thereto. For example, the reference level may be set in the phone book similarly to setting up a ring tone in the person or group category without having an additional menu for setting the reference level.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a camera of a portable terminal, the method comprising:
    determining a rate at which at least a portion of a subject occupies an input image obtained in a video phone call from a camera;
    comparing the determined rate with a preset reference level;
    automatically controlling a zoom function of the camera based on the comparison such that the rate corresponds to the preset level;
    outputting, when the rate does not correspond to the preset reference level because of a limitation of the zoom function of the camera, a notification; and
    transmitting the input image obtained from the camera in which the zoom function is automatically controlled.

2. The method of claim 1, further comprising:
    confirming another portable terminal information in a video phone call connection;
    determining whether the another portable terminal information exists in the phone book; and
    confirming the reference level which is set in one of the another portable terminal information and a group which the another portable terminal information belongs when the another portable terminal information exists in the phone book.

3. The method of claim 2, further comprising setting the reference level as a preset default value when one of the another portable terminal information does not exist in the phone book and the reference level is not set.

4. The method of claim 1, wherein the automatically controlling of the zoom function of the camera comprises:
    activating a zoom-out operation when the rate at which at least a portion of a specific subject occupies the input image is larger than the reference level;
    activating a zoom-in operation when the rate at which at least a portion of a specific subject occupies the input image is smaller than the reference level.

5. The method of claim 1, wherein the automatically controlling of the zoom function of the camera comprises:
    obtaining a difference between the determined rate and the reference level;
    activating the zoom-in operation when the difference between the determined rate and the reference level is negative; and
    activating the zoom-out operation when the difference between the determined rate and the reference level is positive.

6. The method of claim 1, wherein the portion of the subject comprises one of a user, a user's face, a user's eyes and lips that are mapped as vertices of a triangle, and a distance between the user's eyes.

7. The method of claim 6, wherein the determining of the rate comprises:
    detecting a contour of the subject in the input image when the at least a portion of the subject is the user; and
    confirming a size of inside the contour of the user.

8. An apparatus for controlling a camera of a portable terminal, the apparatus comprising:
    a camera for taking a picture of an input image comprising a subject in a video phone call;
    a storage unit for storing a reference level; and
    a controller for determining a rate at which at least a portion of the subject occupies the input image, for comparing the determined rate with the reference level for automatically controlling a zoom function of the camera based on the comparison such that the rate corresponds to the preset reference level, and for outputting, when the rate does not correspond to the preset reference level because of a limitation of the zoom function of the camera, a notification.

9. The apparatus of claim 8, wherein the controller confirms another portable terminal information in a video phone call connection and the reference level which is set in one of the another portable terminal information and a group that the another portable terminal information belongs when the another portable terminal information exists in the phone book.

10. The apparatus of claim 9, wherein the controller sets the reference level as a preset default value when one of the another portable terminal information does not exist in the phone book and the reference level is not set.

11. The apparatus of claim 8, wherein the controller activates a zoom-out operation when the rate at which at least a portion of the subject occupies the input image is larger than the reference level, and activates a zoom-in operation when the rate at which at least a portion of the subject occupies the input image is smaller than the reference level.

12. The apparatus of claim 8, wherein the controller activates the zoom-in operation when a difference between the determined rate and the reference level is negative, and activates the zoom-out operation when the difference between the determined rate and the reference level is positive.

13. The apparatus of claim 8, wherein the portion of the subject is one of a user, a user's face, a user's eyes and lips that are mapped as vertices of a triangle, and a distance between the user's eyes.

14. The apparatus of claim 13, wherein the controller detects a contour of the subject in the input image when the portion of the subject is the user, and confirms a size of inside the contour of the user.

15. The apparatus of claim 8, further comprising an input unit comprising a function key for turning the zoom control function of camera on and off.

16. The apparatus of claim 8, further comprising a wireless communications unit for transmitting an input image to another portable terminal, the input image being photographed by the camera in which the zoom function is controlled.

17. The method of claim 1, wherein the notification comprises at least one of an alarm sound and an alarm message.

18. The apparatus of claim 8, wherein the notification comprises at least one of an alarm sound and an alarm message.

* * * * *